US006824094B2

(12) United States Patent
Richard

(10) Patent No.: US 6,824,094 B2
(45) Date of Patent: Nov. 30, 2004

(54) POWER ASSEMBLY FOR ORNICOPTER

(76) Inventor: Charron Richard, 4529 Willow Pond Ct., E., West Palm Beach, FL (US) 33073

(*) Notice: Subject to any disclaimer, the term of this patent is extended or adjusted under 35 U.S.C. 154(b) by 173 days.

(21) Appl. No.: 10/164,751

(22) Filed: Jun. 6, 2002

(65) Prior Publication Data

US 2003/0226933 A1 Dec. 11, 2003

(51) Int. Cl.[7] ................................................ B64C 33/00
(52) U.S. Cl. .............................. 244/11; 244/6; 244/22; 244/23 A; 244/72
(58) Field of Search ........................... 244/6, 9, 11, 22, 244/17.11, 23 A, 72; 416/124–129, 83; 440/13–15

(56) References Cited

U.S. PATENT DOCUMENTS

| 920,064 | A | * | 4/1909 | Jamnitzky | 244/22 |
|---|---|---|---|---|---|
| 1,040,136 | A | * | 10/1912 | Brown | 244/17.11 |
| 1,109,891 | A | * | 9/1914 | Young | |
| 1,273,267 | A | * | 7/1918 | Peterson | 244/22 |
| 1,403,909 | A | * | 1/1922 | Moir | 416/128 |
| 1,701,762 | A | * | 2/1929 | Pitcairn | 244/17.11 |
| 1,704,112 | A | * | 3/1929 | Stelzer | 244/22 |
| 1,743,516 | A | * | 1/1930 | Andrews | 244/22 |
| 1,879,142 | A | * | 9/1932 | Egan | 416/129 |
| 1,884,848 | A | * | 10/1932 | Pitcairn | 416/129 |
| 1,884,909 | A | * | 10/1932 | Strobell | 244/22 |
| 2,086,883 | A | * | 7/1937 | Shanley | |
| 2,213,538 | A | * | 9/1940 | Whitehead | 416/83 |
| 2,407,777 | A | * | 9/1946 | Grawunder | 244/22 |
| 2,578,845 | A | * | 12/1951 | Schmidt | 244/72 |
| 2,719,591 | A | * | 10/1955 | Schulz | |
| 3,161,376 | A | * | 12/1964 | Lyle | 244/22 |
| 3,162,400 | A | * | 12/1964 | Wood | |
| 3,167,130 | A | * | 1/1965 | Day | |
| 3,321,022 | A | * | 5/1967 | Oguri | |
| 3,578,875 | A | * | 5/1971 | Oguri | |
| 3,625,631 | A | * | 12/1971 | Covington et al. | 416/127 |
| 4,155,195 | A | * | 5/1979 | Leigh-Hunt | 244/11 |
| 4,163,535 | A | * | 8/1979 | Austin | 244/17.11 |
| 4,434,956 | A | * | 3/1984 | Gonzales | 244/17.11 |
| 4,712,749 | A | | 12/1987 | Fox | |
| 4,749,149 | A | * | 6/1988 | Gruich | 244/22 |
| 4,793,573 | A | | 12/1988 | Kelfer | |
| 5,163,861 | A | * | 11/1992 | Van Ruymbeke | 244/11 |
| 5,884,872 | A | * | 3/1999 | Greenhalgh | 244/72 |
| 6,082,671 | A | * | 7/2000 | Michelson | 244/72 |
| 6,206,324 | B1 | * | 3/2001 | Smith | 244/72 |
| 6,227,483 | B1 | | 5/2001 | Therriault | |

FOREIGN PATENT DOCUMENTS

| DE | 3343187 A1 | * | 11/1983 | |
| FR | 2592854 A2 | * | 7/1987 | 244/11 |
| JP | 405178293 | * | 7/1993 | 244/11 |

* cited by examiner

*Primary Examiner*—Jack Keith
*Assistant Examiner*—L. Semunegus
(74) *Attorney, Agent, or Firm*—McHale & Slavin, P.A.

(57) ABSTRACT

An ornithopter has a power assembly which provides flapping of the wings by a reciprocating shaft and bell cranks. The wings are mounted on a hub which rotates in response to the flapping of the wings. The sinusoidal movement of the wings provides lift for flight.

17 Claims, 6 Drawing Sheets

POWER ASSEMBLY FOR ORNICOPTER

FIELD OF THE INVENTION

This invention relates to the field of powered aerial vehicles which derive the lift for flight through the movement of their wings.

BACKGROUND OF THE INVENTION

Man has long wondered and wrote about flying using the same principles as birds. Mythology tells of Icarus who might be considered the first ornithopter fatality. Later, Leonardo de Vinci is credited with the first publication of the possibility of flight using a mechanical vehicle, powered by the occupant, moving bird-like wings for lift. Even today, there is an unclaimed prize for the man powered flight of an helicopter.

After the Wright brothers, the development of aviation quickly by-passed the ornithopter for many reasons, among them the speed and simplicity of the airplane. Interest in vertical flight was almost dormant until Igor Sikorsky started the development of the modern helicopter. The helicopter development was directed toward the same characteristics as the airplane with the additional features of vertical take-off and landing and these characteristics make the helicopter a very complicated aircraft. Again, the ornithopter was not part of the main stream of technology and development.

DESCRIPTION OF THE PRIOR ART

U.S. Pat. No. 4,155,195 to Leigh-Hunt discloses a toy airplane with two pair of overlapping wings which reciprocate vertically out of phase with each other. The power is provided by a rubber band.

U.S. Pat. No. 4,712,749 to Fox discloses a two pairs of wings mounted in tandem along the fuselage of the vehicle. The forward wing of one pair reciprocates in phase with the diagonally located rear wing of the other pair. The other diagonally located wings reciprocate 180 degrees out of phase to reduce torque forces. The power may be by engine.

U.S. Pat. No. 4,793,573 to Kelfer discloses a drive mechanism for an ornithopter with two wings which describe a horizontal figure eight as the vehicle moves through the air. A drive sprocket drives an eccentric and a crank arm joined to a shaft connected to a knee joint for positive control of the wings throughout their up-and-down movement.

U.S. Pat. No. 6,227,483 to Therriault discloses a drive mechanism for an ornithopter with multiple sets of wings. The pitch of the wings is controlled by one drive shaft so that the broad side of the wings face downwardly in downward movement of the wings, during flapping, while the upward movement of the wings presents the leading edge to decrease resistance. Another drive shaft provides the flapping motion. The wings are mounted on opposite sides of the frame of the ornithopter.

What is lacking in the art is a light weight ornithopter with rotating wings which describe a sinusoidal path through the air to produce lift for slow speed flight.

SUMMARY OF THE INVENTION

Accordingly, it is an objective of the instant invention to teach an ornicopter that can hover above the ground and move laterally above the ground with the highest propulsive efficiency and no counterbalancing torque.

It is another objective of the instant invention to teach an ornicopter with a flapping wing which results in rotation of the wing assembly.

It is a further objective of the instant invention to teach an ornicopter having a vertical movement of the wing assembly producing lift and thrust.

Other objects and advantages of this invention will become apparent from the following description taken in conjunction with the accompanying drawings wherein are set forth, by way of illustration and example, certain embodiments of this invention. The drawings constitute a part of this specification and include exemplary embodiments of the present invention and illustrate various objects and features thereof.

DETAILED DESCRIPTION OF THE INVENTION

Figure 1A:
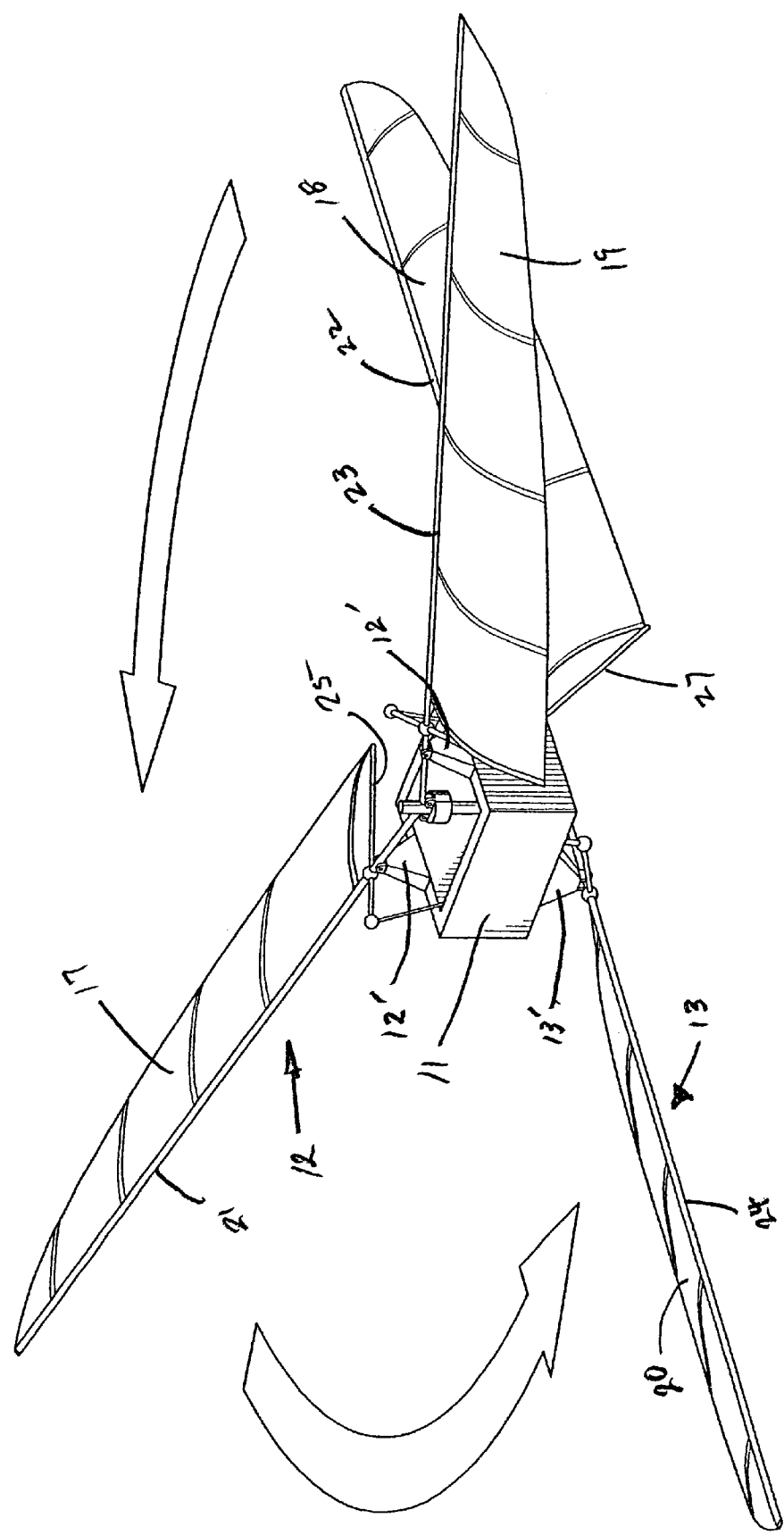
FIG. 1A is a perspective of the rotating wing assembly of the invention with a first set of wings at the limit of upward movement.
Figure 3:
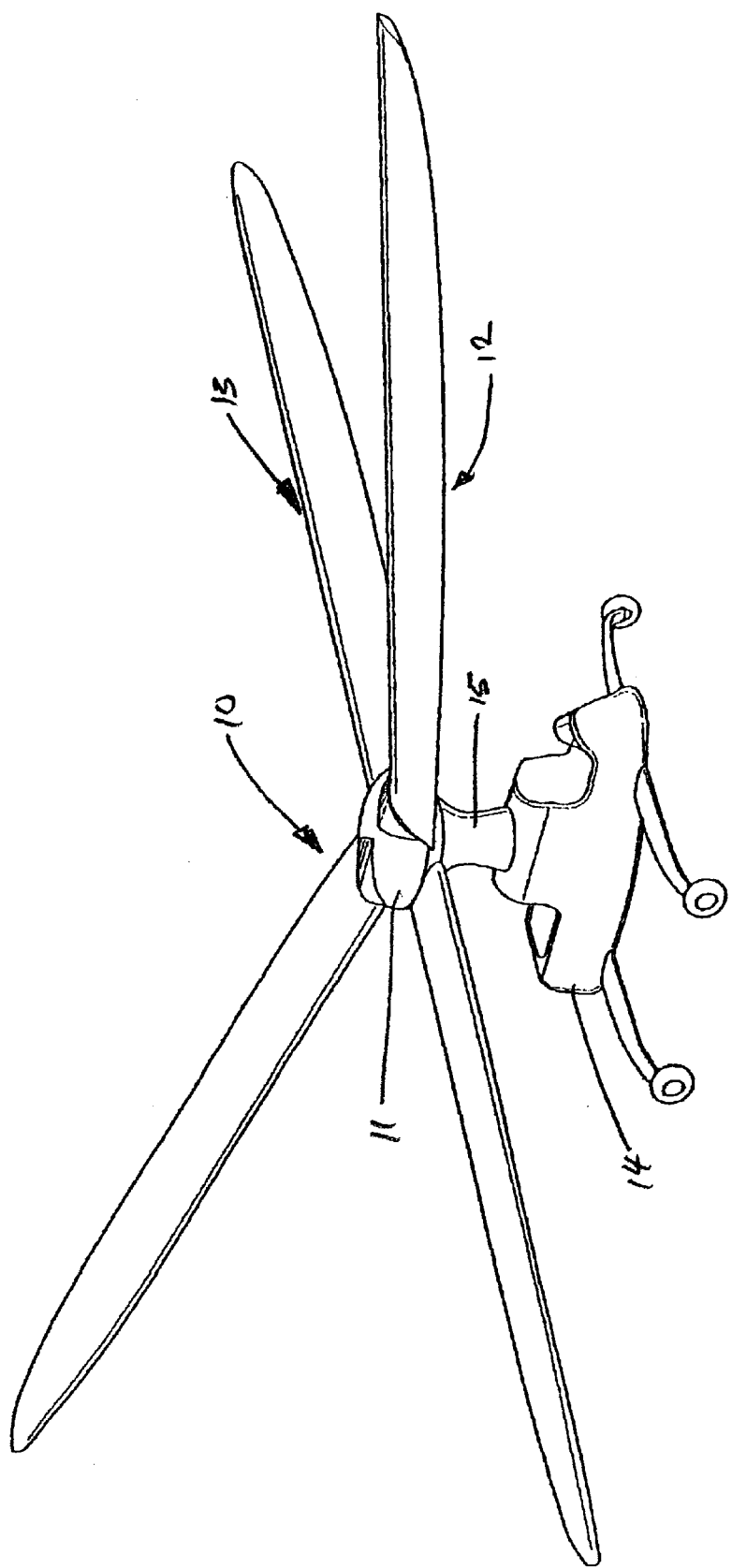
FIG. 3 is a perspective of an ornithopter of this invention.
Figure 4:
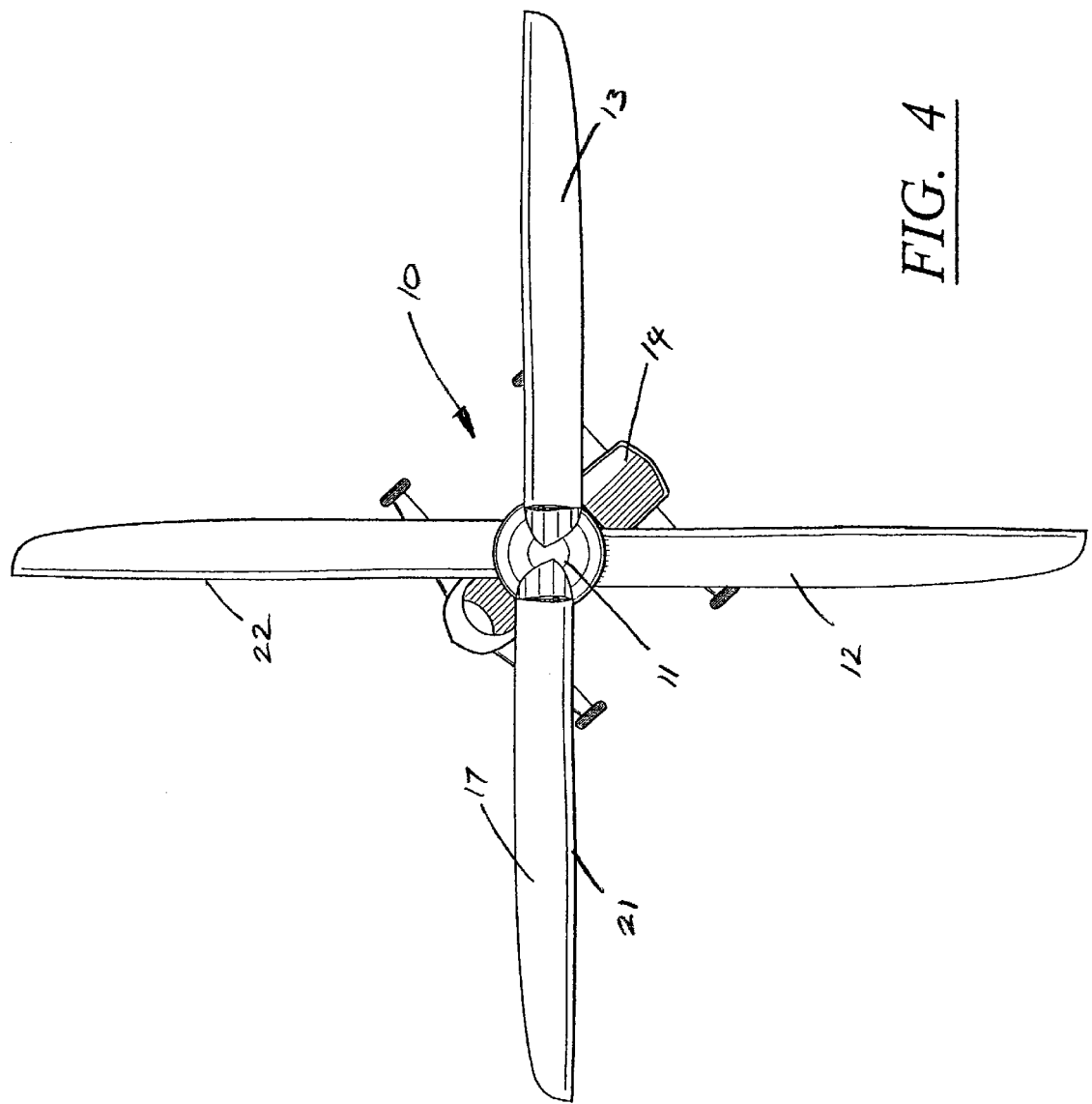
FIG. 4 is a top plan view of the ornithopter of this invention.

The wing assembly 10, as shown in FIG. 1A, has a hub enclosure 11. As illustrated in the FIG., the hub rotates in the counter clockwise direction. The hub 11 carries with it four wings mounted in two diametrically opposed sets 12 and 13. The hub 11 is mounted on the top of the fuselage 14, as shown in FIGS. 3 and 4, by supporting shaft 15. The shaft 15 transfers the lift of the rotating wing assembly 10 to the fuselage 14 for flight. The sets of wings 12 and 13 are pivotally mounted one above the other 90 degrees apart on the hub 11 by hinged pylons 12' located on the upper periphery of the hub and 13' located on the bottom periphery of the hub. The propulsive efficiency of the system is such that man powered flight may be possible.

Figure 1B:
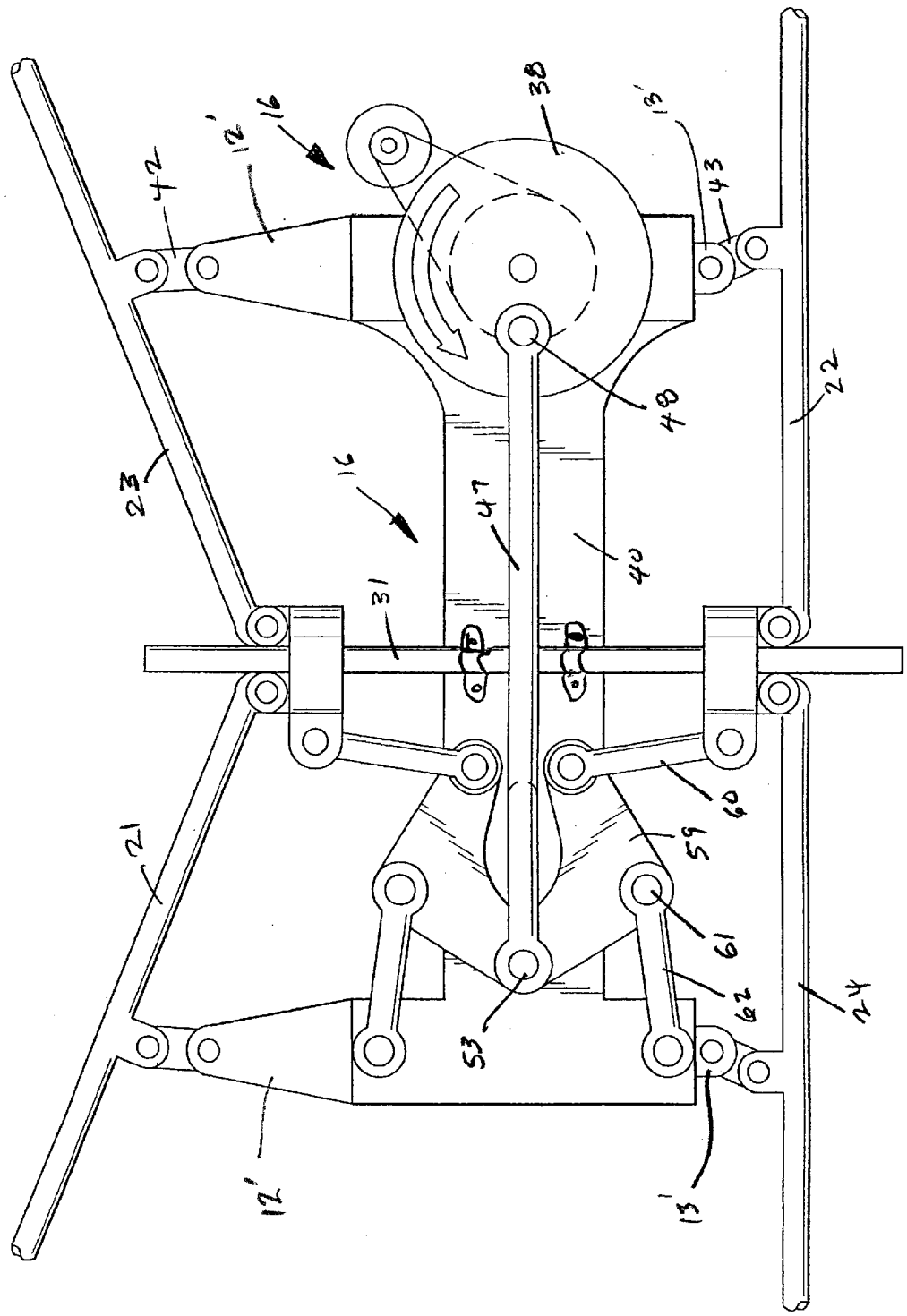
FIG. 1B is a perspective of the drive mechanism with the wings positioned as described in FIG. 1A.
Figure 2A:
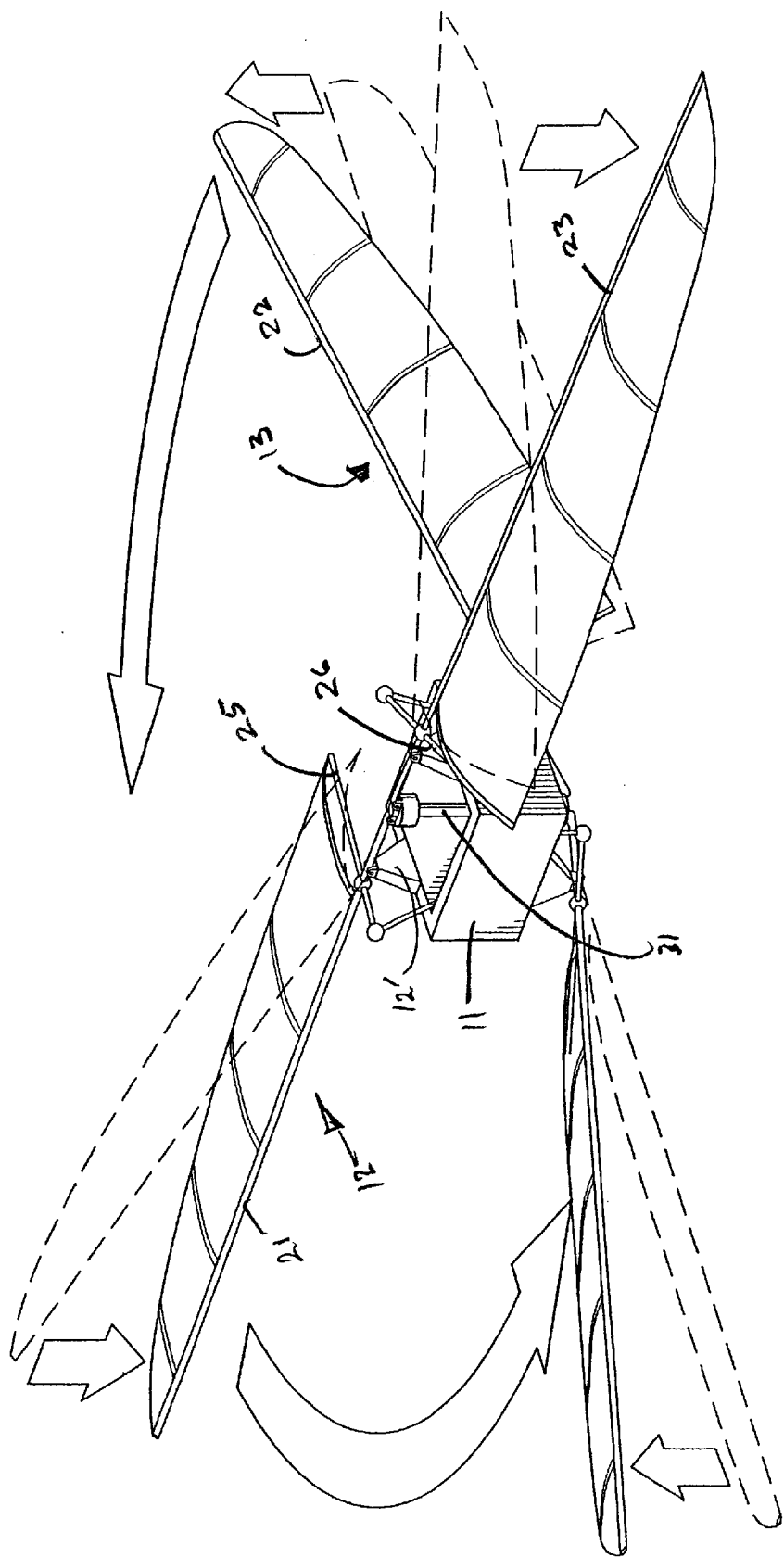
FIG. 2A is a perspective of the rotating wing assembly of the invention with the first set of wings at the limit of downward movement.
Figure 2B:
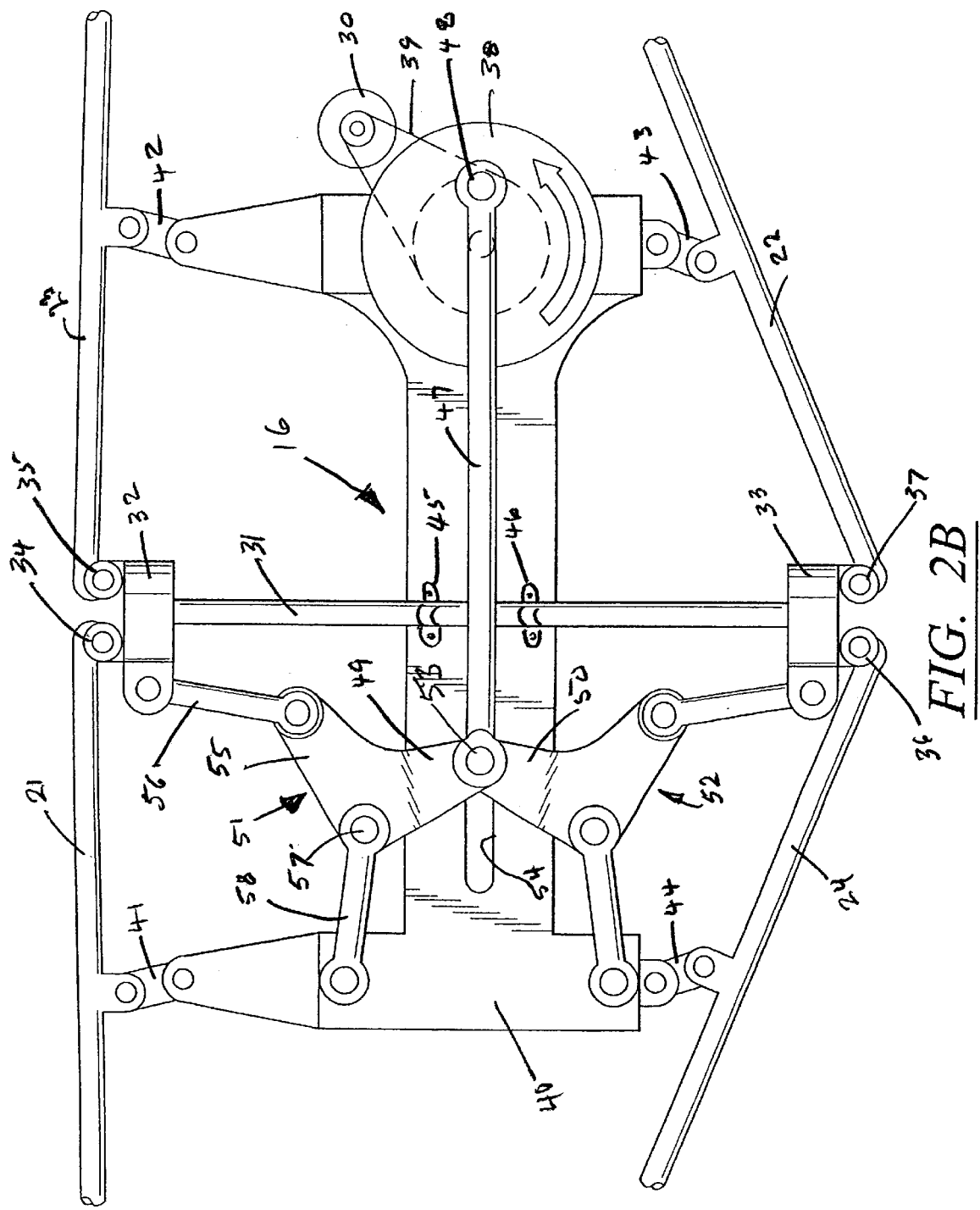
FIG. 2B is a perspective of the drive mechanism with the wings positioned as described in FIG. 2A.

A power assembly 16, shown in FIGS. 1B and 2B, produces vertical movement of the wings. The vertical movement of the wings produces rotation of the hub 11 as a result of the orientation of the air foils. The term, "horizontally," refers to a plane that is generally parallel with the longitudinal axis of the fuselage and, "vertical," refers to an axis generally normal thereto. As a result of these relative movements, the wing tips describe a somewhat sinusoidal path through the air around the vertical axis 31.

The airfoils 17, 18, 19, and 20 of the wings each have variable angle of attack and wing twist. The airfoils may be of form sustaining materials, such as foams, laminates or other light weight compositions. Or they may be polymeric films or fabrics, such as MYLAR, KEVLAR or others, mounted on spars 21, 22, 23, and 24 at the leading edges and booms 25, 26, 27, and 28 at the bases. The booms are rotatably mounted on the spars. The angle of the boom in relation to horizontal may be fixed or adjustable by flight controls. This angular relation develops the twist and angle of attack of the air foils.

The airfoil may be shaped similar to sails by setting the tension on the airfoil by adjusting the downhaul (tension parallel to the spar), outhaul (tension parallel to the boom) or boom vang (vertical angle between boom and spar) to produce one regime of flight. As in sailing, the relative wind caused by wing flapping will react to the cambered surface along the chord of the air foil to produce forward motion and lift of the air foils. Also, the angle of attack and twist of the air foils may be adjusted by flight controls to alter flight characteristics during flight. By varying the angle of attack, yaw can be induced into the ornicopter. Also, yaw may be induced by varying the hub RPM.

As shown in FIGS. 1B and 2B, the power assembly 16 producing the vertical component of the operation of the wings has a power source 30 mounted on the hub 11 and a central bearing shaft 31 which is rigidly attached to the hub 11. The shaft 31 is operatively attached to and rotates relative to the shaft 15 of the vehicle. The rotation of the hub 11 is derived from the flapping of the wings. The rotation of the wing assembly 10 is relatively slow. By way of illustration and not limitation, the RPM of the hub and wings may be in the range of 30–100 RPM. Of course, other embodiments may have higher or lower RPM. The lift generated by the rotation of the wings is sufficient for overcoming the weight of the ornicopter. Therefore, the RPM would be changed in direct proportion with the weight of the vehicle other things remaining equal.

As an example, the relationship between the vertical movement of the wings and the rotation of the wing assembly may be such that as the air foils move through two complete vertical cycles, the wing assembly rotates 360 degrees. The air foils 17, 18, 19, and 20 move vertically by way of upper linear bearings 32 and lower linear bearings 33 traversing portions of the linear bearing shaft 31. The upper and lower linear bearings 32 and 33 are pivotally connected to the spars at 34, 35, 36 and 37, respectively. As illustrated, the rotation and forward thrust of the wings is a consequence of the shape and angle of attack of the wings and the rapidity of the flapping of the wings developed by the output of the power source 30. However, this fixed relationship may be changed mechanically, if desired, to produce another result.

The power assembly 16, shown in FIGS. 1B and 2B, has a drive wheel 38 rotated by the power source 30 through a belt 39 and pulley system. The power source 30 is mounted on the hub, as shown in FIG. 1B, to allow the power source to rotate with the power assembly 16. However, the power source may be located elsewhere on the airframe and otherwise connected to the drive wheel 38. Other devices may be used to transfer the power from the power source 30 to the drive wheel 38, such as a drive train, geared or non-geared, or other conventional devices. The power source 30 may develop energy from be any type fuel, including electricity, liquid or gas fuels, fuel cells, solar or manual force. The drive wheel 38 is rotatably mounted on a support frame 40 located between the upper and lower sets of wings. The support frame extends across the central axis of the hub 11 and is connected to both sets of wings via the hinge pylons. The support frame 40 is connected to the upper spar 21 by hinge 41 of pylon 12', to the upper spar 23 by hinge 42 of pylon 12', to lower spar 22 by hinge 43 of pylon 13' and lower spar 24 by hinge 44 of pylon 13' to allow for relative movement between the components during operation. The support frame and linear bearing shaft 31 are rigidly attached by brackets 45 and 46 near the central portion. The drive wheel 38 has a reciprocating drive link 47 with one end eccentrically mounted on said drive wheel at pin 48. The other end of the drive link 47 and the power arms 49 and 50 of two bellcranks 51 and 52 are attached by a pivoting connection 53 which travels in guide slot 54 in support frame 40 for reciprocation of the upper and lower wings.

The other arm 55 of the bell crank 51 is connected to the linear bearing 32 through the dog bone link 56. The central pivot point 57 of the bell crank is pivotally connected to the support frame 40 by stabilizing link 58.

The other arm 59 of bell crank 52 is pivotally connected to linear bearing 33 by dog bone link 60. The central pivot point 61 of bell crank 52 is pivotally connected to the support frame 40 by stabilizing link 62.

As can be ascertained by this arrangement of components, the turning of the drive wheel 38 results in reciprocation of drive line 47 which pivots bell cranks 51 and 52 to impart vertical motion to the wing sets 12 and 13. The bell cranks are arranged, as shown in the FIGS., so that the wing sets 12 and 13 operate 180 degrees out of phase. Specifically, as one set is moving vertically to the full limit of travel in one direction the other set is moving to the full limit of travel in the opposite direction and vice versa. This synchronized opposite movement of the wings counterbalances the vertical forces generated by the power assembly 16. This counterbalancing of forces smooths out the vertical impulses to the fuselage. Further, since the power stroke is vertical, there is no torque developed in the power train. Therefore, there is no need for any counter rotation devices such as used in helicopters. The empennage of the ornicopter may be formed conventionally.

It is to be understood that while a certain form of the invention is illustrated, it is not to be limited to the specific form or arrangement of parts herein described and shown. It will be apparent to those skilled in the art that various changes may be made without departing from the scope of the invention and the invention is not to be considered limited to what is shown and described in the specification and drawings.

What is claimed is:

1. An ornicopter having a longitudinal axis producing flight by reciprocation of its wings normal to the longitudinal axis comprising a hub, at least one set of two wings, each wing of said set pivotally connected at one end portion to said hub and arranged diametrically opposite to one another, said hub adapted for rotation, a power assembly connected to said one end portion of each of said wings, said power assembly reciprocating said one end portion of each of said wings, said each wing of said set including means to twist and warp during reciprocation whereby said reciprocating of one end portion of said each wing of said set pivots said each wing of said set about said hub normal to the longitudinal axis and develops rotation of said hub resulting in lift and thrust for flight.

2. An ornicopter of claim 1 further comprising a second set of at least two wings, each of said wings of said second set of wings pivotally connected at one end portion of each to said hub and arranged diametrically opposite to one another, said power assembly connected to an end portion of each of said wings of said second set, said power assembly reciprocating said one end portion of each of said wings of said second set, said reciprocating of said one set of wings being 180 degrees out of phase with said reciprocating of said second set of wings, whereby said reciprocating of one end portion of each of said wings of said second set of wings pivots each of said second set of wings about said hub normal to the longitudinal axis.

3. An ornicopter of claim 2 further comprising a top periphery on said hub vertically separated from a bottom periphery of said hub, said first set of wings pivotally connected to said top periphery of said hub, said second set of wings pivotally connected to said bottom periphery of said hub.

4. An ornicopter of claim 3 further comprising one wing in said one set arranged at 90 degrees about said hub from one wing is said second set.

5. An ornicopter of claim 1 further comprising flexible air foils forming said wings, said air foils having a surface bounded by a leading edge, a trailing edge and a base, said surface of said air foils having a twist and angle of attack.

6. An ornicopter of claim 5 further comprising a spar connected to said leading edge of said air foil, one end portion of said spar connected to said power source and pivotally connected to said hub, a boom connected to said base of said air foil, one end portion of said boom movably connected to said one end portion of said spar to adjust said twist and angle of attack.

7. An ornicopter of claim 2 further comprising flexible air foils forming said wings, said air foils having a surface bounded by a leading edge, a trailing edge and a base, said surface of said air foils having a twist and angle of attack.

8. An ornicopter of claim 7 further comprising a spar connected to said leading edge of said air foil, one end portion of said spar connected to said power source and pivotally connected to said hub, a boom connected to said base of said air foil, one end portion of said boom movably connected to said one end portion of said spar to adjust said twist and angle of attack.

9. An ornicopter of claim 3 further comprising flexible air foils forming said wings, said air foils having a surface bounded by a leading edge, a trailing edge and a base, said surface of said air foils having a twist and angle of attack.

10. An ornicopter of claim 9 further comprising a spar connected to said leading edge of said air foil, one end portion of said spar connected to said power source and pivotally connected to said hub, a boom connected to said base of said air foil, one end portion of said boom movably connected to said one end portion of said spar to adjust said twist and angle of attack.

11. An ornicopter of claim 1 further comprising an elongated bearing shaft fixed to said power assembly and extending in said hub normal to said longitudinal axis, each end of each wing of said at least one set of wings mounted on said bearing shaft for reciprocating movement.

12. An ornicopter of claim 11 further comprising a fuselage extending along said longitudinal axis, said hub operatively connected to said fuselage to translate lift to said fuselage.

13. An ornicopter of claim 3 further comprising an elongated bearing shaft fixed to said power assembly and extending in said hub normal to said longitudinal axis, each end of each wing of said first and second sets of wings mounted on said bearing shaft for reciprocating movement.

14. An ornicopter of claim 13 further comprising a fuselage extending along said longitudinal axis, said hub operatively connected to said fuselage to translate lift to said fuselage.

15. In an ornicopter having a set of diametrically opposed wings pivotally attached to a free-wheeling rotatable hub, a power assembly for reciprocating said wings, said power assembly comprising a power source connected to a drive wheel, said drive wheel rotatably mounted on a support plate, said drive wheel eccentrically connected to one end of a power link, a bell crank pivotally mounted on said support plate, said bell crank having two arms, the other end of said power link connected to one arm of a bell crank, the other arm of said bell crank connected to a linear bearing slidably connected to a bearing shaft, said bearing shaft connected to said support plate, said linear bearing connected to the wings of said set of diametrically opposed wings whereby said power source is adapted to turn said drive wheel to generate pivoting action of said wings and said free-wheeling hub rotates as a reaction thereto.

16. In an ornicopter having a free-wheeling rotatable hub mounted on the top of the fuselage as claimed in claim 15, said hub carrying a second set of pivotally attached diametrically opposed wings, one of said sets oriented 90 degrees about said hub from the other set and a second bell crank pivotally mounted on said support plate, said second bell crank having two arms, the other end of said power link connected to one arm of said second bell crank, the other arm of said second bell crank connected to a second linear bearing slidably connected to said shaft, said second linear bearing connected to the wing spars of said second set of diametrically opposed wings.

17. In an ornicopter as claimed in claim 16 wherein said bell cranks are disposed 180 degrees out of phase with each other whereby the pivoting of said sets of diametrically opposed wings is approximately equal and opposite.

\* \* \* \* \*